(12) United States Patent
Jin

(10) Patent No.: US 8,531,079 B2
(45) Date of Patent: Sep. 10, 2013

(54) MOTOR AND MOTOR DRIVEN POWER STEERING SYSTEM USING THE SAME

(75) Inventor: Jong Hak Jin, Hwaseong-si (KR)

(73) Assignee: Mando Corporation, Pyeongtaek-Si (KR)

( * ) Notice: Subject to any disclaimer, the term of this patent is extended or adjusted under 35 U.S.C. 154(b) by 272 days.

(21) Appl. No.: 13/156,504

(22) Filed: Jun. 9, 2011

(65) Prior Publication Data

US 2011/0316379 A1    Dec. 29, 2011

(30) Foreign Application Priority Data

Jun. 29, 2010   (KR) .................... 10-2010-0061754

(51) Int. Cl.
*H02K 3/04*    (2006.01)
(52) U.S. Cl.
USPC .......................................... 310/208; 310/198
(58) Field of Classification Search
USPC ................. 310/204–205, 184, 198, 208, 234
See application file for complete search history.

(56) References Cited

U.S. PATENT DOCUMENTS

| | | | | |
|---|---|---|---|---|
| 3,733,506 A * | 5/1973 | Jaffe et al. | ...................... | 310/198 |
| 4,459,503 A * | 7/1984 | Kropp et al. | ................... | 310/198 |
| 4,857,790 A * | 8/1989 | Kamiyama et al. | ........... | 310/234 |
| 7,352,100 B2 * | 4/2008 | Ito et al. | .................. | 310/216.011 |
| 7,560,848 B2 * | 7/2009 | Roos et al. | ..................... | 310/234 |
| 8,079,133 B2 * | 12/2011 | Roos | ................................ | 29/598 |
| 8,188,632 B2 * | 5/2012 | Miyajima | ..................... | 310/225 |
| 2008/0001492 A1 * | 1/2008 | Cros et al. | ..................... | 310/233 |
| 2010/0084941 A1 * | 4/2010 | Miyajima | ..................... | 310/198 |

\* cited by examiner

*Primary Examiner* — Thanh Lam
(74) *Attorney, Agent, or Firm* — McDermott Will & Emery LLP

(57) ABSTRACT

The present disclosure relates to a motor and a motor driven power steering system using the same. More particularly, the present disclosure relates to a motor adapted to maintain a balance of currents, and a motor driven power steering system adapted to reduce vibrations and noise and enhance steering quality using the same.

7 Claims, 4 Drawing Sheets

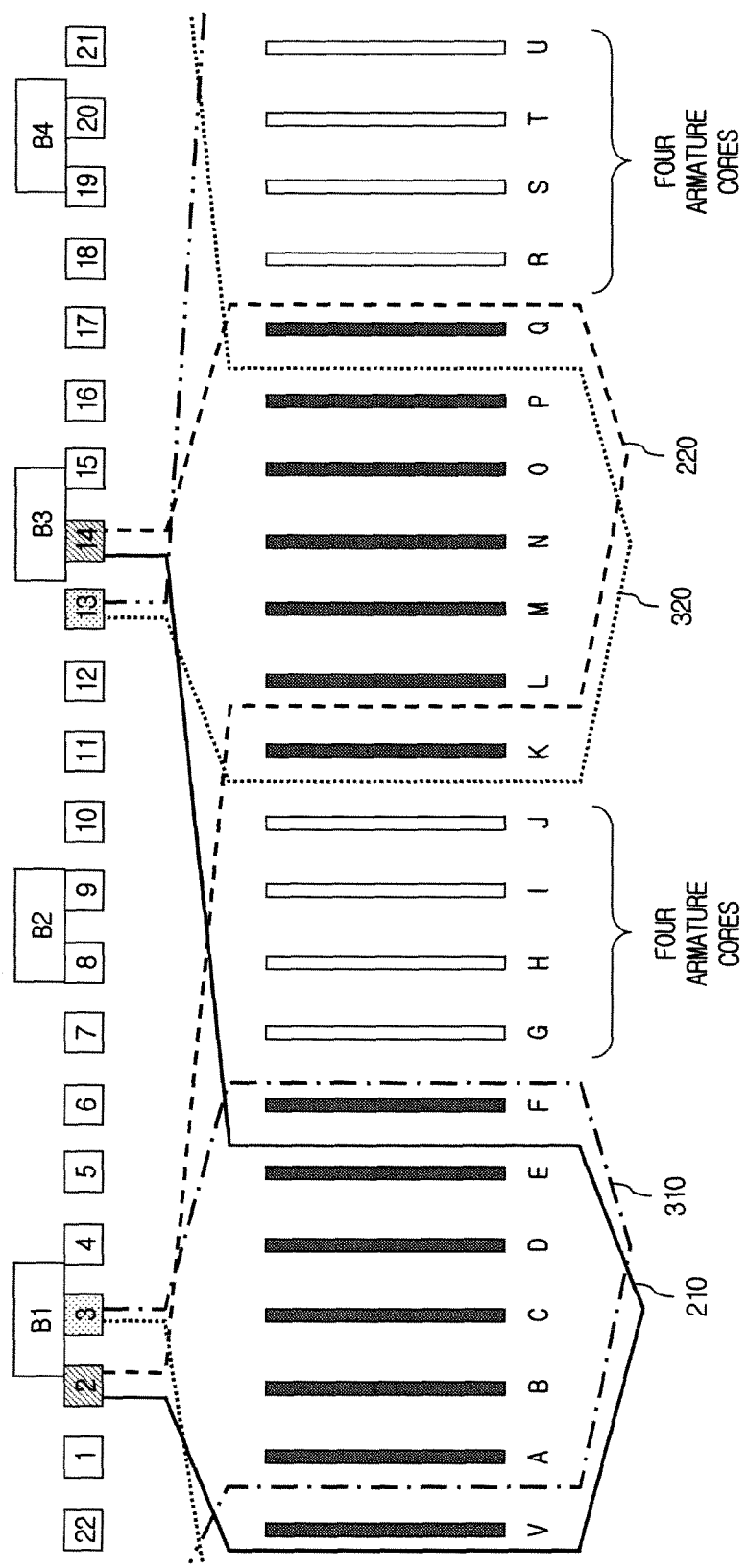

MOTOR AND MOTOR DRIVEN POWER STEERING SYSTEM USING THE SAME

CROSS-REFERENCE TO RELATED APPLICATION

This application claims priority from and the benefit under 35 U.S.C. §119(a) of Korean Patent Application No. 10-2010-0061754, filed on Jun. 29, 2010, which is hereby incorporated by reference for all purposes as if fully set forth herein.

BACKGROUND OF THE INVENTION

1. Field of the Invention

The present invention relates to a motor and a motor driven power steering system using the same, and more particularly to a motor adapted to maintain a balance of currents, and a motor driven power steering system adapted to reduce vibrations and noise and enhance steering quality using the same.

2. Description of the Prior Art

In a conventional motor for a motor driven power steering system, a balance of currents flowing between armature windings connected in parallel often collapses. The collapse of a balance of currents also causes collapse of a balance of forces applied to an armature and generates vibrations and connections, rapidly lowering steering quality.

Thus, in order to solve the collapse of a balance of currents, a motor is conventionally designed to have a structure point-symmetrical with respect to a rotation center of an armature. However, in spite of a design of a point-symmetrical structure, there occurs a difference between a pair of armature windings connected in parallel to a pair of segments, so currents of different magnitudes flow at a same voltage, still collapsing a balance of currents.

SUMMARY OF THE INVENTION

Accordingly, the present invention has been made to solve the above-mentioned problems occurring in the prior art, and an object of the present invention is to provide a motor in which armature windings are wound to maintain a balance of currents flowing through the armature windings.

It is another object of the present invention to provide a motor driven power steering system adapted to reduce vibrations and noise and enhance steering quality through a motor configured to maintain a balance of currents.

In order to accomplish this object, there is provided a motor including: an armature core having a plurality of slots; two or more armature windings inserted into the slots and wound on the armature core; and a commutator having a plurality of segments, wherein a pair of armature windings of the two or more armature windings are connected in parallel to a pair of non-adjacent segments of the plurality of segments such that winding lengths of the armature windings of the pair are the same.

In accordance with another aspect of the present invention, there is provided a motor driven power steering system including: a motor including: an armature core having a plurality of slots; two or more armature windings inserted into the slots and wound on the armature core; and a commutator having a plurality of segments, wherein a pair of armature windings of the two or more armature windings are connected in parallel to a pair of non-adjacent segments of the plurality of segments such that winding lengths thereof are the same.

The present invention provides a motor on which armature windings can be wound in a motor to maintain a balance of currents flowing through the armature windings.

Also, the present invention provides a motor driven power steering system which can reduce vibrations and noise and enhance steering quality through the motor 100 adapted to maintain a balance of currents.

BRIEF DESCRIPTION OF THE DRAWINGS

The above and other objects, features and advantages of the present invention will be more apparent from the following detailed description taken in conjunction with the accompanying drawings, in which:

FIG. 4 is a further exemplary view illustrating an armature winding method of the motor according to the embodiment of the present invention.

DETAILED DESCRIPTION OF THE PREFERRED EMBODIMENTS

Figure 1:
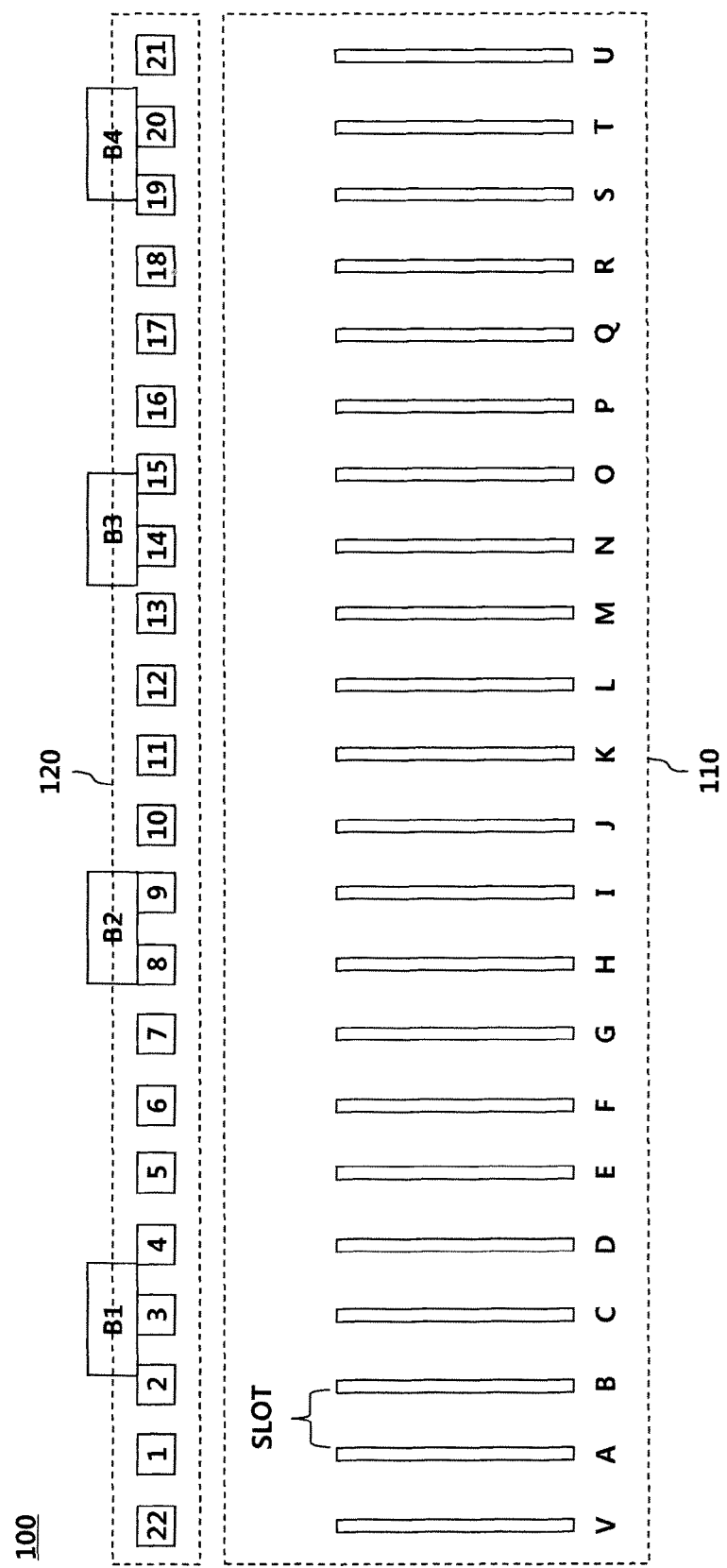
FIG. 1 is a plan view exemplifying an armature core and a commutator of a motor according to an embodiment of the present invention.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 exemplifies an armature core 110 and a commutator 120 of a motor 100 according to an embodiment of the present invention.

Referring to FIG. 1, the motor 100 according to the embodiment of the present invention includes an armature core 110 having a plurality of slots, two or more armature windings inserted through the slots and wound on the armature core 110, and a commutator 120 having a plurality of segments 1, 2, . . . , and 22.

In the example of FIG. 1, the armature core 110 includes an armature core A, an armature B, . . . , an armature U, and an armature core V.

The above-mentioned slot refers to a space between two armature cores through which an armature winding is inserted. In the example of FIG. 1, there exist twenty two slots including a space between the armature core V and the armature A, a space between the armature core A and the armature B, ..., a space between the armature core T and the armature U, and a space between the armature core U and the armature core V.

Hereinafter, a winding method for an armature winding according to the present invention will be described.

A pair of armature windings (i.e. two armature windings) of the two or more armature windings of the motor 100 are connected in parallel to "a pair of non-adjacent segments" among the plurality of segments (1, 2, ..., and 22) of the commutator 120. In the example of FIG. 1, "the second segment and the fourteenth segment" and "the third segment and the thirteenth segment" form pairs of non-adjacent segments.

One of the pair of non-adjacent armature windings is inserted through a slot situated at a location where it is not symmetrical (point-symmetrical) to the remainder of the pair of armature windings with respect to a rotation center of the armature core 110, and is wound on the armature core 110.

Since a pair of armature windings are wound in the above-mentioned manner, the number of slots situated between two slots through which each pair of armature windings are inserted are the same.

When in addition to a pair of armature windings (i.e. two armature windings) connected in parallel to a pair of segments (e.g. the second segment and the fourteenth segment), another pair of armature windings connected in parallel to another pair of segments (e.g. the third segment and the thirteenth segment) are additionally wound, a method of winding the two pairs of armature windings is as follows.

A pair of armature windings connected in parallel to a pair of segments (e.g. the second segment and the fourteenth segment) and having an asymmetric (point-asymmetric) structure and another pair of armature windings connected to another pair of segments (e.g. the third segment and the thirteenth segment) and having an asymmetric (point-asymmetric) structure are wound on the armature core 110 such that two pairs of segments including a pair of segments (e.g. the second segment and the fourteenth segment) and another pair of segments (e.g. the third segment and the thirteenth segment) form a symmetric structure (that may be a surface-symmetric structure). With such a surface-symmetric structure, vibrations and noise can be restrained by generating a symmetric electromagnetic force in an armature even when a balance of current is collapsed.

Then, a location of a slot through which a pair of armature windings (i.e. two armature windings) connected in parallel to a pair of segments (e.g. the second segment and the fourteenth segment) differs from that of a slot through which another pair of slots connected in parallel to another pair of segments (e.g. the third segment and the thirteenth segment).

The motor 100 according to the embodiment of the present invention where armature windings are wound according to the above-mentioned armature winding method may be an DC motor installed in a motor driven power steering (MDPS) system and having a plurality of brushes (B1, B2, B3, and B4 of FIG. 1).

Hereinafter, the above-mentioned armature winding method will be described in detail with reference to FIGS. 2 to 4.

Figure 2:
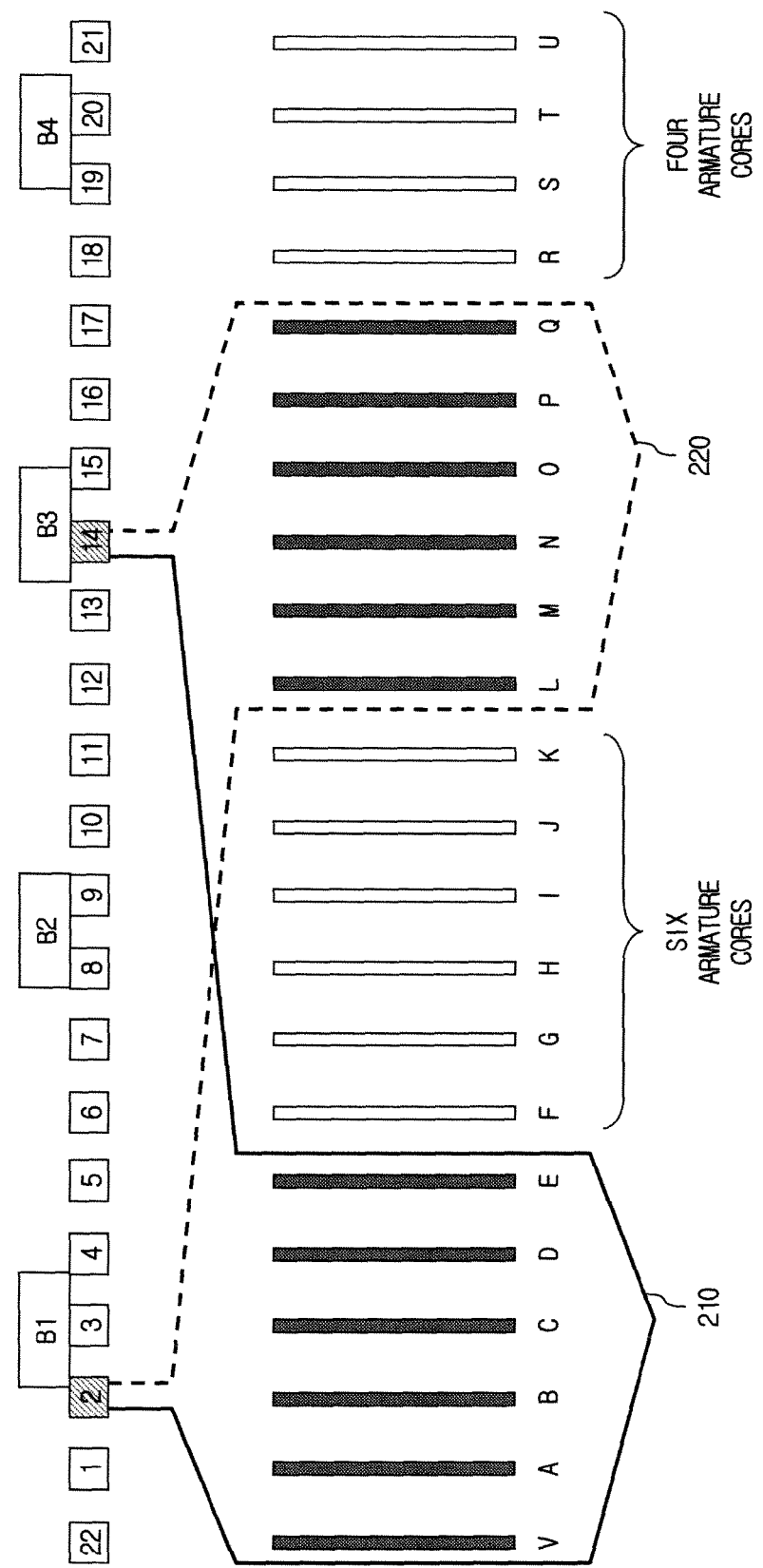
FIG. 2 is an exemplary view illustrating an armature winding method of the motor according to the embodiment of the present invention.

FIG. 2 is an exemplary view illustrating an armature winding method of the motor 100 according to the embodiment of the present invention.

Referring to FIG. 2, a pair of armature windings 210 and 220 of the two or more armature windings of the motor 100 are connected in parallel to a pair of segments of a plurality of segments 1, 2, ..., and 22 of a commutator 120, in which case a pair of segments to which the pair of armature windings 210 and 220 are connected in parallel are "two non-adjacent segments (i.e. the second segment and the fourteenth segment)".

Referring again to FIG. 2, one 210 of the pair of non-adjacent armature windings 210 and 220 is inserted through a slot situated at a location where it is not point-symmetrical to the remaining armature winding 220 with respect to a rotation center of the armature core 110, and is wound on the armature core 110.

That is, one 210 of the pair of armature windings 210 and 220 is inserted and wound through a slot ("U-V slot") between the armature core U and the armature core V and a slot ("E-F slot") between the armature core E and the armature core F, and the remaining armature winding 220 is inserted and wound through a slot ("K-L slot") between the armature core K and the armature core L and a slot ("Q-R slot") between the armature core Q and the armature core R, such that the pair of armature windings 210 and 220 are not symmetrical (point-symmetrical) with respect to a rotation center of the armature core 110.

In more detail, as illustrated in FIG. 2, although there exist six armature cores including the armature core F, the armature core G, the armature core H, the armature core I, the armature core J, and the armature core H between the E-F slot through which one armature winding 210 is inserted and the K-L slot through which the remaining armature winding 220 is inserted, since there exist four armature cores including the armature core R, the armature core S, the armature core T, and the armature core U between the U-V slot through which one armature winding 210 is inserted and the Q-R slot through which the remaining armature winding 220 is inserted, the pair of armature windings 210 and 220 are not symmetrical (point-symmetrical) with respect to a rotation center of the armature core 110.

As the pair of armature windings 210 and 220 are wound in the above-mentioned manner, the lengths of the pair of armature windings 210 and 220 are the same. Accordingly, since there occurs no difference between a resistance in the armature winding 210 and a resistance in the armature winding 220, a same magnitude of currents flow through them at a same voltage, allowing restriction of electric vibrations. Here, the lengths of the armature winding 210 and the armature winding 220 may be slightly different due to a manufacturing error.

Figure 3:
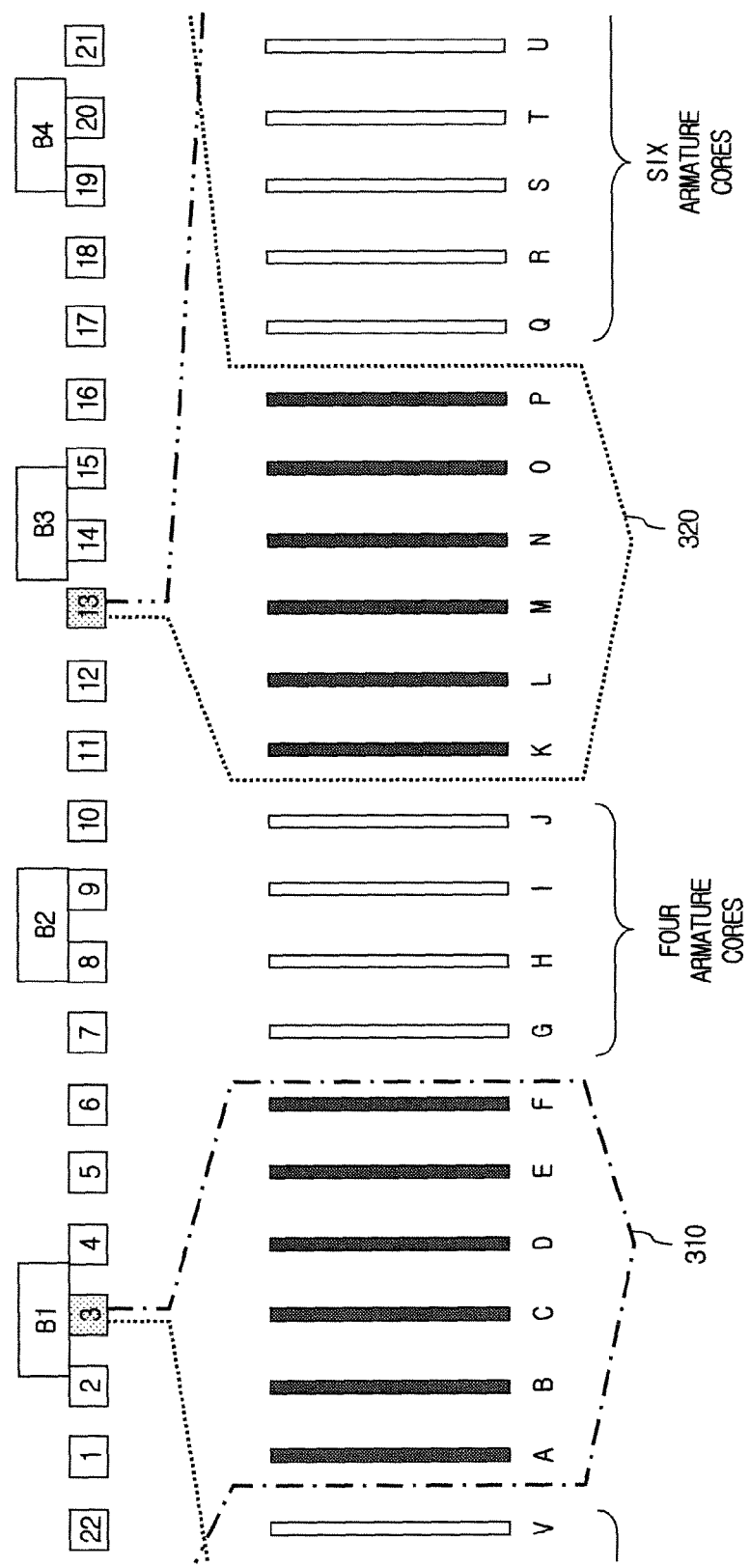
FIG. 3 is another exemplary view illustrating an armature winding method of the motor according to the embodiment of the present invention.

FIG. 3 is another exemplary view illustrating an armature winding method of the motor 100 according to the embodiment of the present invention.

Referring to FIG. 3 a pair of armature windings 310 and 320 of the two or more armature windings of the motor 100 are connected to parallel to a pair of segments of a plurality of segments 1, 2, ..., and 22 of a commutator 120, in which case a pair of segments to which the pair of armature windings 310 and 320 are connected in parallel are "two non-adjacent segments (i.e. the third segment and the thirteenth segment)".

Referring again to FIG. 3, one 310 of the pair of non-adjacent armature windings 310 and 320 is inserted through a slot situated at a location where it is not point-symmetrical to the remaining armature winding 320 with respect to a rotation center of the armature core 110, and is wound on the a mature core 110.

That is, one 310 of the pair of armature windings 310 and 320 is inserted and wound through a slot ("V-A slot") between the armature core V and the armature core A and a slot ("F-G slot") between the armature core F and the armature core G, and the remaining armature winding 320 is inserted and wound through a slot ("J-K slot") between the armature core J and the armature core K and a slot ("P-Q slot") between the armature core P and the armature core Q, such that the pair of armature windings 310 and 320 are not symmetrical (point-symmetrical) with respect to a rotation center of the armature core 110.

In more detail, as illustrated in FIG. 3, although there exist four armature cores including the armature core G, the armature core H, the armature core I, and the armature core J between the F-G slot through which one armature winding 310 is inserted and the J-K slot through which the remaining armature winding 320 is inserted, since there exist six armature cores including the armature core Q, the armature core R, the armature core S, the armature core T, the armature core U, and the armature core V between the V-a slot through which one armature winding 310 is inserted and the P-Q slot through which the remaining armature winding 320 is inserted, the pair of armature windings 310 and 220 are not symmetrical (point-symmetrical) with respect to a rotation center of the armature core 110.

As the pair of armature windings 310 and 320 are wound in the above-mentioned manner, the lengths of the pair of armature windings 310 and 320 are the same. Accordingly, since there occurs no difference between a resistance in the armature winding 310 and the armature winding 320, a same magnitude of currents flow through them at a same voltage, allowing restriction of electric vibrations.

FIG. 4 is a further exemplary view illustrating an armature winding method of the motor 100 according to the embodiment of the present invention.

FIG. 4 illustrates a method of winding two pairs of armature windings including the pair of armature windings 210 and 220 of FIG. 2 and the pair of armature windings 310 and 320 of FIG. 3. Methods of winding the pair of armature windings 210 and 220 and the remaining pair of armature windings 310 and 320 of the two pairs of armature windings are the same as the methods of FIGS. 2 and 3.

Meanwhile, although the pair of armature windings 210 and 220 connected in parallel to the pair of segments (the second segment and the fourteenth segment) and the remaining pair of armature windings 310 and 320 connected in parallel to the pair of segments (the third segment and the thirteenth segment) are not symmetrical (point-symmetrical) with respect to a rotation center of the armature core 110 respectively, the two pairs of armature windings including the pair of armature windings 210 and 220 connected in parallel to the pair of segments (the second segment and the fourteenth segment) and the remaining pair of armature windings 310 and 320 connected in parallel to the pair of segments (the third segment and the thirteenth segment) are surface-symmetrical with respect to the two pairs of segments including the pair of segments (the second segment and the fourteenth segment) and the pair of segments (the third segment and the thirteenth segment).

In more detail, as illustrated in FIG. 4, there exist four armature cores including the armature core G, the armature core H, the armature core I, and the armature core J between the F-G slot through which one armature winding 310 is inserted and the J-K slot through which the armature winding 320 is inserted and there exist four armature cores including the armature core R, the armature core S, the armature core T, and the armature core U between the U-V slot through which one armature winding 210 is inserted and the Q-R slot through which the armature winding 220 is inserted, the two pairs of armature windings 210, 220, 310, and 320 are surface-symmetrical with respect to the two pairs of segments including the pair of segments (the second segment and the fourteenth segment) and the remaining pair of segments (the second segment and the fourteenth segment).

Then, all the slots (the U-V slot, the E-F slot, the K-L slot, and the Q-R slot) through which the armature windings 210 and 220 connected in parallel to the pair of segments (the second segment and the fourteenth segment) are inserted differ from the slots (the V-A slot, the F-G slot, the J-K slot, and the P-Q slot) through which the pair of armature windings 310 and 320 connected in parallel to the remaining pair of segments (the third segment and the thirteenth segment) are inserted.

A collapse of a balance of currents, which may be generated because a pair of armature windings 210 and 220 connected in parallel to a pair of segments (the second segment and the fourteenth segment) and another pair of armature windings 310 and 320 connected in parallel to another pair of segments (the third segment and the thirteenth segment) are not symmetrical (point-symmetrical) respectively, can be compensated for through the method and structure of winding two pairs of armature windings including the pair of armature windings 210 and 220 and the remaining pair of armature windings 310 and 320 illustrated in FIG. 4 by allowing the armature windings to have a surface-symmetrical structure, making it possible to generate symmetrical electromagnetic forces in the armature core 110 and thus restraining vibrations and noise.

As mentioned above with reference to FIGS. 2 and 3, the pair of armature windings 210 and 220 have the same winding length. Accordingly, since there occurs no difference between a resistance in the armature winding 210 and a resistance in the armature winding 220, a same magnitude of currents flow through them at a same voltage, allowing restriction of electric vibrations. Furthermore, since the pair of armature windings 310 and 320 have the same winding length and there occurs no difference between a resistance in the armature winding 310 and a resistance in the armature winding 320, a same magnitude of currents flow through them at a same voltage, allowing restriction of electric vibrations.

The present invention can provide a motor driven power steering (MDPS) system operated by the motor having the above-mentioned structure (the structure according to the method of winding armature windings).

Such a motor driven power steering system includes an armature core 110 having a plurality of slots, two or more armature windings inserted into the slots and wound on the armature core 110, and a commutator 120 having a plurality of segments.

Then, a pair of armature windings 201 and 220 or 310 and 320 of the two or more armature windings are connected in parallel to a non-adjacent segments (the second segment and the fourteenth segment or the third segment and the thirteenth segment) of the plurality of segments.

In addition, one armature winding of the pair of armature windings 210 and 220 or 310 and 320 is inserted through a slot situated at a location where it is not symmetrical (point-symmetrical) to the remaining armature winding with respect to a rotation center of the armature core 110 to be wound on the armature core 110.

As described above, the present invention provides a motor 100 on which armature windings can be wound in a motor to maintain a balance of currents flowing through the armature windings.

Also, the present invention provides a motor driven power steering system which can reduce vibrations and noise and enhance steering quality through the motor 100 adapted to maintain a balance of currents.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units. In addition, each of the components may be implemented as an independent hardware.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although preferred embodiments of the present invention have been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A motor comprising:
   an armature core having a plurality of slots;
   two or more armature windings inserted into the slots and wound on the armature core; and
   a commutator having a plurality of segments,
   wherein a pair of armature windings of the two or more armature windings are connected in parallel to a pair of non-adjacent segments of the plurality of segments such that winding lengths of the armature windings of the pair are the same.

2. The motor as claimed in claim 1, wherein the number of slots situated between two slots through which each of the pair of armature windings are inserted is the same.

3. The motor as claimed in claim 1, wherein the slots through which the pair of armature windings are inserted are situated at locations different from those of the slots through which another pair of armature windings connected in parallel to another pair of segments are inserted.

4. The motor as claimed in claim 1, wherein one of the pair of armature windings is inserted through a slot situated at a location where it is not symmetrical to the other of the pair of armature windings with respect to a rotation center of the armature core.

5. The motor as claimed in claim 4, wherein two pairs of armature windings including a pair of asymmetrical armature windings connected in parallel to the pair of segments and another pair of asymmetrical armature windings connected in parallel to another pair of segments are wound on the armature core so as to be symmetrical with respect to the two pairs of segments including the pair of segments and the remaining pair of segments.

6. The motor as claimed in claim 1, wherein the motor is a DC motor further including a plurality of brushes.

7. A motor driven power steering system comprising a motor,
   wherein the motor comprises:
   an armature core having a plurality of slots;
   two or more armature windings inserted into the slots and wound on the armature core; and
   a commutator having a plurality of segments,
   wherein a pair of armature windings of the two or more armature windings are connected in parallel to a pair of non-adjacent segments of the plurality of segments such that winding lengths thereof are the same.

* * * * *